Oct. 30, 1962 C. L. BEAL 3,060,501
METHOD AND APPARATUS FOR TREATMENT OF POLYMERS
Filed May 27, 1960 3 Sheets-Sheet 1
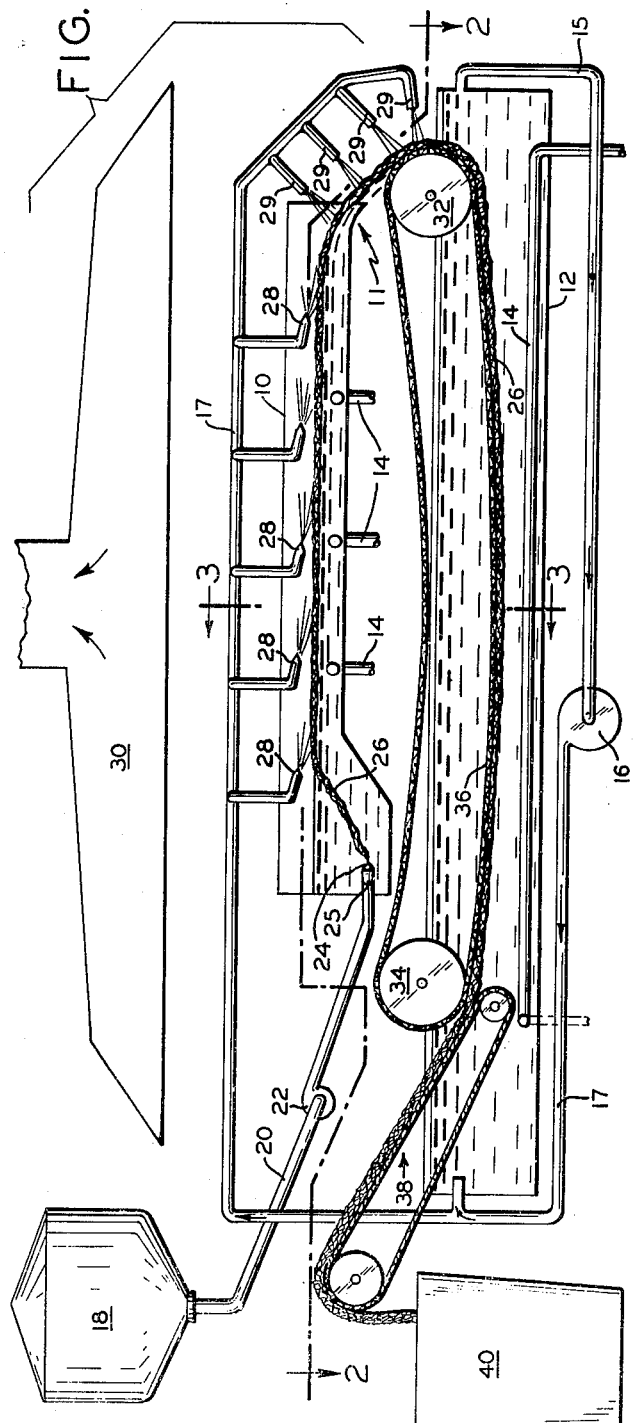
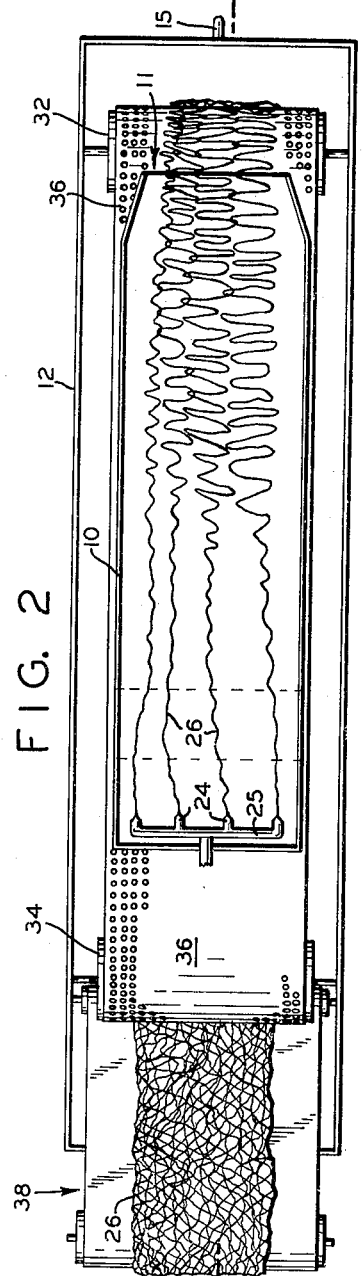
INVENTOR.
CARL L. BEAL
BY
BLAIR, SPENCER & BUCKLES
ATTORNEYS.

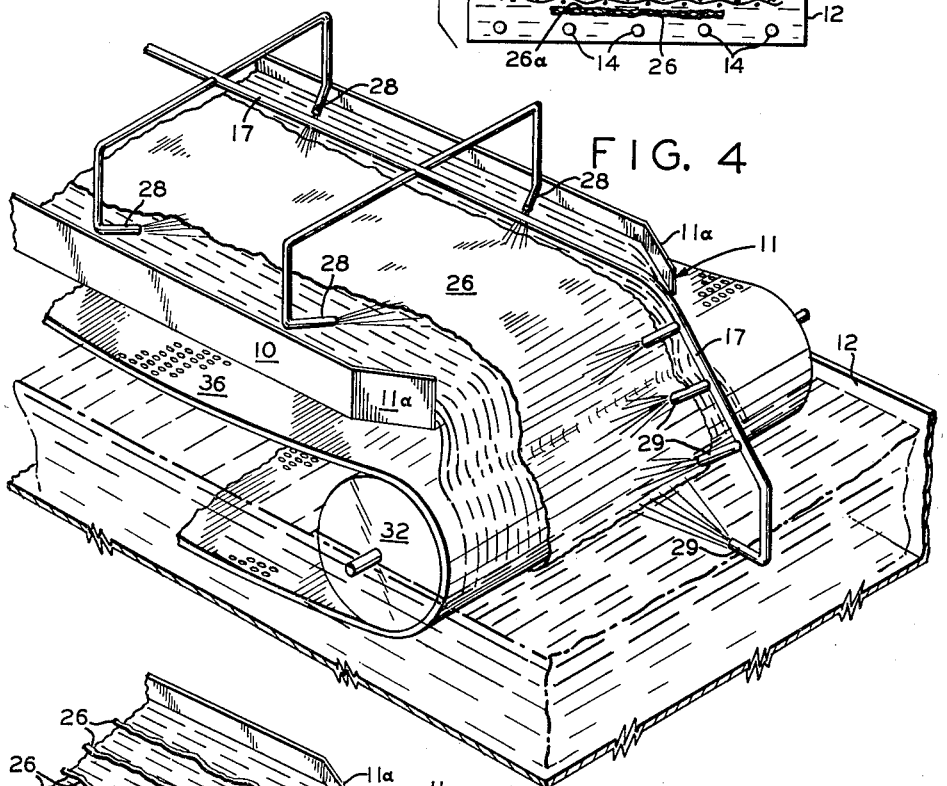

Oct. 30, 1962 C. L. BEAL 3,060,501
METHOD AND APPARATUS FOR TREATMENT OF POLYMERS
Filed May 27, 1960 3 Sheets-Sheet 3

INVENTOR.
CARL L. BEAL
BY
BLAIR, SPENCER & BUCKLES
ATTORNEYS.

United States Patent Office 3,060,501
Patented Oct. 30, 1962

3,060,501
METHOD AND APPARATUS FOR TREATMENT OF POLYMERS
Carl L. Beal, Huntington Station, N.Y., assignor to Crawford & Russell Incorporated, Stamford, Conn.
Filed May 27, 1960, Ser. No. 32,193
11 Claims. (Cl. 18—8)

This invention relates to methods and apparatus for removing organic solvents from solutions or other mixtures of natural and/or synthetic polymers, copolymers, elastomers, plastic materials and the like by direct contact of those solutions or mixtures with a liquid heat transfer medium.

There are many of the above described solutions or mixtures of materials from which organic solvents can be advantageously volatilized by the methods and apparatus of this invention. These may be roughly divided into three classes:

*Class A.*—Organic solvent solutions of elastomers and/or other plastic materials resulting from polymerization in solution, in the form as polymerized or as modified by further chemical or polymerization action or by being compounded.

In this class are the as-polymerized and/or compounded solutions of polyisoprene, polybutadiene, ethylene-propylene copolymers, butadiene-isoprene copolymers, homopolymers or copolymers of a vinyl ether, and various other polymers and copolymers.

*Class B.*—Organic solutions of elastomers and/or plastic materials resulting from dissolving such material and/or synthetic polymers in solvents, and chemically or physically modifying such polymers while in solution or suspension in the solvent or solvents.

Examples of this class are the chlorinated, sulfochlorinated, isomerized or graft or addition polymer or copolymer of elastomers or plastics such as natural rubber, polyisoprene, polybutadiene, butadiene-styrene copolymers, butadiene-isoprene copolymers, polychloroprene, polyethylene, polypropylene, polybutylene, and various other polymers and copolymers, resulting from vinyl and/or other types of polymerizations.

*Class C.*—Combinations of classes A and B, with or without added compounding ingredients such as, for example, sulfur, zinc oxide, vulcanization accelerators, age resistors, pigments, fillers, plasticizers oxidation catalysts, etc.

There are many practical solvents for such elastomers and polymers as listed above including pentane, hexane, heptane, benzene, esters, ketones, or halogenated solvents such as carbon tetrachloride, methylene chloride, chloroform or methyl or ethyl chloride.

In synthesizing the above elastomers, the amount of solvent in the polymer solution may range from 60% to 95%. The high proportion of solvent to polymer has resulted in particularly difficult problems in removing the solvent and in handling the polymer solution. These polymer solutions are very viscous and extremely sticky, and they consequently adhere tenaciously to any surface with which they come in contact.

There are a number of methods now known in the art for attempting removal of the solvent from polymer solutions. One well-known method of solvent removal involves making a slurry of the polymer solution in water, and then feeding the slurry to a continuous rotary drum-type vacuum filter. A blanket of wet polymer is formed on the drum, peeled off and broken up into chunks by tearing rolls, and then sent to a dryer. Another approach to the removal of solvents from the polymer solutions has been by extrusion. In this method, the solution is extruded under heat and pressure, and the solvent is vaporized and squeezed from the solution. Other attempts at solvent removal entail spray drying towers for quick free-falling of the solution to remove the solvent. Still another method has been extraction of the solvent into a liquid in which the solvent is soluble but which has no undesirable effects upon the polymer itself.

All of the above methods have serious disadvantages. First of all, in the above methods it is not possible to economically have a continuous solvent removal operation since the apparatus used in the solvent removal process must be cleaned periodically, during which time the operation must be shut down. Another objection to the above methods is that the equipment must be very large and expensive. This is particularly true in the drum-drying and extruder approaches. Another disadvantage of the extruder method is that the extrusion must be carried on very slowly in order to permit the solvent to escape through porous areas of the extruder. It has been found that spray drying and free-falling of the polymer solution results in the formation of a hardened surface or "skin" on the bits of polymer solution, thus trapping the solvent within the small portions of polymer solution. The extraction method also is extremely limited, as very few of the organic solvents used in polymerization are readily soluble in practicable extraction liquids.

Thus, prior to my invention, there has been no practical and inexpensive method or apparatus for the removal of solvents from polymer solutions and particularly adapted for economical removal of a sufficient amount of solvent whereby the sticky polymer solution can be subsequently handled by other processing apparatus without adhering thereto.

Accordingly it is an object of the present invention to provide methods and apparatus for the removal of solvents from polymer solutions to enable efficient handling of the polymer during subsequent processing.

Another object of the invention is to provide methods and apparatus of the above character wherein continuous removal of solvents from polymer solutions is possible without costly shut-down for cleaning of the apparatus.

A further object of the invention is to provide methods and apparatus of the above character in which a liquid heat transfer medium is utilized to volatilize the solvent for removal from the polymer solution.

Another object of the invention is to provide methods and apparatus of the above character in which contact is minimized between the polymer solution and other equipment to which it might adhere.

A further object of the invention is to provide methods and apparatus of the above character which are relatively efficient and economical in operation and installation.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 1 is a diagrammatic side view of a preferred embodiment of the invention;

FIGURE 2 is a diagrammatic top view taken along line 2—2 of FIGURE 1;

FIGURE 3 is a diagrammatic end view, partially in section along line 3—3 of FIGURE 1;

FIGURE 4 is a diagrammatic perspective view of the polymer and bath transfer end of the embodiment of the invention shown in FIGURE 1;

FIGURE 5 is a diagrammatic perspective view of the polymer and bath transfer end of the apparatus shown in FIGURES 1 and 4, illustrating the solvent removal from separate strands of polymer solution;

FIGURE 6 is an end view of an injector manifold and opening through which the polymer solution emerges as a flat ribbon;

FIGURE 7 is an end view of an injector manifold and openings in which the polymer solution emerges in individual strands;

Like reference characters denote like parts throughout the several views of the drawings.

Figure 8:
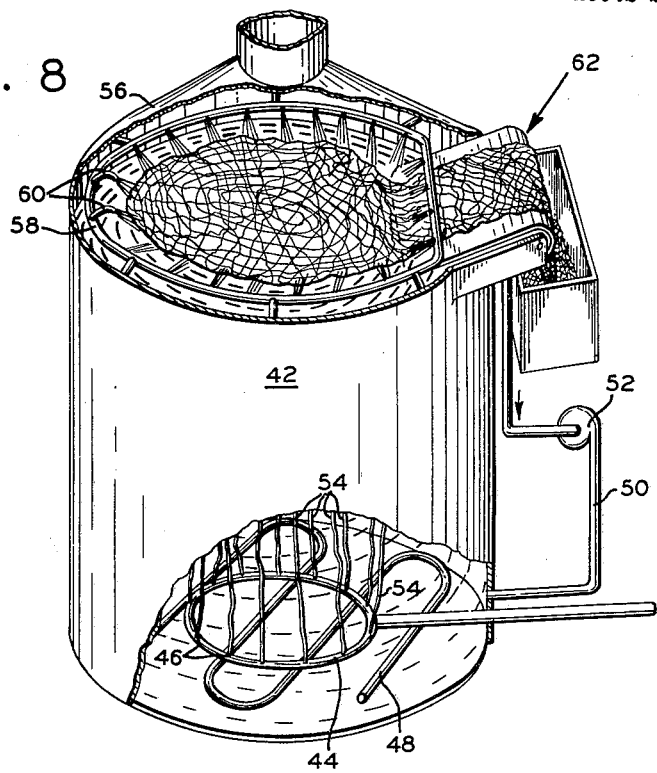
FIGURE 8 is a diagrammatic perspective view of another embodiment of the invention.

Because of the presence of large amounts of solvent, the solutions are viscous and tacky and adhere tenaciously to most any surface or piece of equipment contacted. Until most of this solvent is removed, the solutions are extremely difficult to handle or process. A number of the prior art approaches to handling the polymers in solution have been unsatisfactory as they are generally inefficient and time-consuming, or use expensive equipment. Many of the present day techniques for solvent removal from polymer solutions are practiced simply as attempts to utilize existing equipment and methods in processing new materials. This is particularly true in the case of processes described above.

In general, most of these elastomers and polymers can be easily handled after 50% to 100% of the solvent has been removed. The tackiness or adhering quality of the solution is, of course, dependent upon the particular polymers and solvents used. The present invention will efficiently and economically remove solvents in any desired proportion, the percentage of solvent removed being dependent upon processing time, water temperature and other easily controlled variables.

My invention utilizes a liquid (usually water) both as a heat transfer medium and preferably as a polymer solution conveying medium, at least during the initial stages of solvent removal. In accordance with my invention, the polymer solution is injected into or onto water that is maintained at a temperature considerably above the boiling point of the solvent or solvents in the solution. As heat from the water is transferred to the polymer solution, there occurs an initial flash vaporization of the solvent which causes a "blown" or puffing effect of the polymer solution as the solvent is heated to a gaseous state. The "blown" polymer solution rises to and floats on the surface of the heated water, and is carried along by controlled water flow. With the polymer in a swollen condition, it may then be further treated for removal of additional solvent. The swollen polymer is maintained as a continuous strand or ribbon as it is carried on the surface of the heated water. As the strands or ribbons of swollen polymer are floated on the flowing water, they may be sprayed with hot water from about, thus retaining the surface of the polymer in a soft porous condition to permit escape of the volatilized solvent. Removal of still more of the solvent is accomplished by immersion of the swollen polymer in the heated water, as will be described more fully hereinafter.

It should be understood that heated water is described throughout the specification as the heat transfer and conveying agent for treatment of the polymer solution, because it is inexpensive and has a higher boiling point than many of the commonly used organic solvents. It should be understood, however, that the invention contemplates the use of any liquid which will perform the same function as water, i.e., as a heat transfer and conveying agent for solvent removal. Some examples of these additional liquids are water solutions of salts or other dissolved materials which may be used to elevate the boiling point of the water and which may be easily leached out of the polymer after the solvent is removed. Such solutions would be particularly useful with higher boiling solvents such as heptane. Still another alternative would be to add methanol, ethanol or other compounds that will form lower boiling azeotropic mixtures with the solvents present in the polymer solutions. In certain applications it may also be desirable to add anti-tack agents and/or surfactants to the water or liquid used in the process. Such additives are well-known in the art and will not be elaborated upon. Thus, it can be seen that any liquid may be used in place of water that possesses the desired characteristics of high boiling points and easy removal from the polymer, and that has no deleterious effect on the polymer itself.

The preferred apparatus for practicing the methods of the present invention includes a trough or water chute which is preferably positioned above a long tank. The polymer is injected into heated flowing water in the trough and is carried down the trough, preferably by the moving water. While moving down the trough, the polymer solution is preferably sprayed with hot water from above to aid in driving off a considerable portion of the solvent from the polymer solution. The water in the trough flows over the end of the trough opposite the injector, carrying the floating polymer with it. As the water flows out of the trough, it is caught by the lower tank which is provided with a continuous mesh conveyor belt for receiving the partially devolatilized, swollen polymer. This mesh then inverts the polymer and holds it immersed under the hot water in the tank as the polymer is carried by the belt through the water. Thus the remainder or desired amount of the solvent in the polymer may be removed as the swollen polymer is completely surrounded by hot water during this immersion step.

The invention has many advantages. Among these are: (a) the polymer solution contacts only hot water during the initial stages of solvent removal, facilitating its later handling by conveying devices in subsequent operations, (b) the boiling point of water is considerably above the boiling point of many of the organic solvents used in present day polymer solutions, (c) heating of the polymer solution by water minimizes surface hardening of the polymer, thus permitting escape of the solvent from the interior of the strands or ribbons of swollen polymer, (d) the solvents are driven off in a gaseous state and can be economically recovered by condensation apparatus, (e) treatment time, water bath temperature, and cross-sectional area of polymer solution can be controlled to remove the proportion of solvent desired, (f) the apparatus used is relatively inexpensive to install and maintain and may run continuously with a minimum of attention from operating personnel, as the polymer is formed as continuous strands, ribbons or the like, and (g) exposure of large surface area for efficient and simultaneous washing out of water soluble materials in the polymer while the solvent is removed.

The invention will now be described in more detail. As seen in FIGURES 1 and 2, a trough 10 having an open end 11 is positioned above an open top tank 12. The trough 10 and tank 12 are filled with water which is heated by steam pipes 14 and circulated by pump 16 via conduits 15 and 17. The polymer solution may be brought from a storage vessel 18 through conduit 20 by a pressure pump 22 for injection into the water in trough 10. The polymer solution is ejected into and preferably under the surface of the water in trough 10 through one or more openings 24 in the manifold 25, as continuous viscous strands or ribbons 26.

Initial heating of the polymer solution volatilizes entrained solvent, causing the strands or ribbons 26 to become porous and to rise to the surface of the water, and they are carried down the trough by the water flow, As the swollen polymer solution is carried down trough 10, a plurality of hot water nozzles 28 spray the upper surfaces of the floating polymer with hot water. These nozzles are preferably directed inwardly (FIGURE 3), to prevent adherence of the swollen polymer to the sides of trough 10, and downstream of the liquid flow to aid in moving the polymer along the surface of the water. A hood 30 is provided for carrying off vaporized solvent, which may be recovered by appropriate condensation apparatus (not shown).

The flowing water in trough 10 spills over the open end 11 and into tank 12, thus carrying the floating polymer with it. As the swollen polymer is carried over this "water fall," it is received by a wide continuous driven mesh belt 36, which is preferably made of hydrophilic material such as cotton to minimize adherence of the polymer to the belt. The belt is continuously moving in the direction of the arrows and passes around drums 32, 34 associated with tank 12. The mesh belt 36 traps the swollen polymer and moves it through the hot water in tank 12 in a completely immersed condition. It should be noted that the now least-sticky surface of swollen polymer, which was in contact with the surface of the water in trough 10, is now in contact with the mesh belt 36, thus avoiding adherence to belt 36 while assuring maximum water contact with all surfaces of the swollen polymer for maximum heat absorption from the water. After the removal of the desired amount of solvent in tank 12, the polymer is received by conveyor apparatus 38 for removal to a bin or other processing apparatus 40.

Referring now to FIGURES 3 and 4, it will be seen that the side portions 11a of open end 11 of trough 10 are turned slightly inwardly to guide and increase the velocity of water flow over the "water fall." Thus, the floating polymer is continuously fed to the mesh belt 36 by the force of the water falling from trough 10.

As shown in FIGURES 1 and 4, the polymer may be further heated and urged against the mesh belt in the vicinity of drum 32 by hot water spraying nozzles 29.

Referring to FIGURE 3, it will again be seen that surface 26a of the swollen polymer which was in contact with the water in trough 10 now contacts the mesh belt 36 to enhance maximum surface contact of the polymer with the hot water. The immersion of the swollen polymer is maintained by the mesh belt 36, as it has a low specific gravity and tends to float upward toward the belt. The rate of movement of mesh belt 36 will of course be controlled, dependent upon the rate at which the polymer solution is injected from manifold 25. Control of the injection rate of the polymer solution, the rate of water flow in trough 10 and the belt speed maintains the swollen polymer as strands, ribbons or the like, i.e., in continuous form.

As shown in FIGURE 5, the polymer solution may be processed as single strands instead of permitting the strand to form a mat or blanket as shown in FIGURE 4. The polymer solution can be maintained as one or more continuous strands by increasing the rate of water flow in trough 10 and the speed of belt 36.

As shown in FIGURE 6, the injection manifold 25 may be provided with a long, narrow slit 42 for injecting a ribbon or strip of polymer solution into the water, or the manifold may be provided with a plurality of openings 24 as shown in FIGURE 7 to inject one or more strands of the polymer solution for processing. Although a single slit is shown in FIGURE 6 and four openings are shown in FIGURE 7, it should be understood that any number, shape or size of opening may be used for the injection, depending upon the nature of the polymer solution.

In operation the polymer solution is injected into the water in trough 10 through openings 24. The heated water quickly vaporizes the solvent in the polymer solution causing a blowing effect which floats the swollen polymer to the water surface. As the polymer floats on the surface of the water in trough 10, it is continuously carried downstream toward the "water fall" end 11 of the trough. Water spraying of the floating polymer aids in moving the material and in further heating it, as well as preventing its adherence to the sides of trough 10. Continuous single strands, ribbons or matted masses (as shown in FIGURES 2 and 4) may be produced at the water fall end of trough 10 depending upon the water flow rate in the trough and the injection rate for the polymer solution. As the partially devolitalized polymer solution is received by the mesh belt 36, it is immersed in the hot water of tank 12 and is retained in immersed condition as it travels longitudinally of the tank. The mesh belt 36 is preferably made of a hydrophilic material such as cotton, thus retaining enough water to prevent adherence of the polymer to the belt. A great amount of solvent is driven from the swollen polymer as it is passed through tank 12 where the heated water completely surrounds the polymer. The mesh of belt 36 not only permits better contact with the surrounding water, but also permits escape of the volatilized solvent. As the mesh belt 36 passes around drum 34, the polymer is released from the belt and is removed from the tank 12 by a delivery conveyor 38, which also is preferably made of hydrophilic material such as cotton.

Although many of the solvents generally used are insoluble in water, the method and apparatus of the present invention will also work with solvents that are soluble or partially soluble in water. Because of the high temperature of the water, the water soluble and/or insoluble solvents will be vaporized and driven off, to be collected through hood 30 for exhaust or recovery by condensation.

Figure 9:
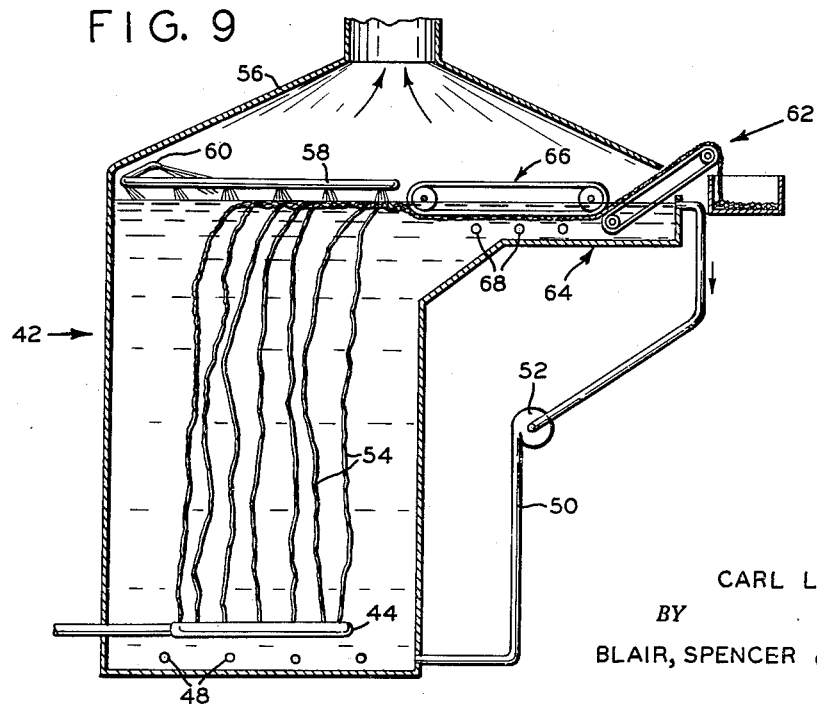
FIGURE 9 is a diagrammatic side view of an embodiment of the invention which combines the embodiments of FIGURES 1 and 8.

Other embodiments of the invention are shown in FIGURES 8 and 9. As seen in FIGURE 8, some polymer solutions may be devolatized by injection into hot water at considerable depth. For this purpose, a vertically positioned tank 42 is provided with an injector manifold 44, having a plurality of openings 46 for injection of the polymer solution at or near the bottom of tank 42. Steam pipes 48 may be provided for heating the water in the tank. In some applications, it may be desirable to pass live steam into the tank or to provide water heating means associated with the water circulating conduits 50 or pump 52. The injection of hot water or live steam at various locations and different levels may be employed to direct the movement of polymer within the water bath, as well as to maintain the desired temperature of the bath.

Upon injection into the hot water, the polymer solution 54 will become "blown" or swollen by the initial flash volatilization of solvent, and will rise toward the surface of the water in the tank. Dependent upon the particular properties of the polymer in solution and the amount of solvent to be removed, the injection depth may be varied as may other factors such as water temperature, size of injector openings, etc. Vaporized solvent will bubble up through and out of the water as it is driven from the polymer solution, to be carried off through hood 56 for exhaust or recovery. Around the upper periphery of the tank, a number of hot water sprays 58 may be provided to prevent adherence of the swollen polymer to the walls of the tank. One or more directed sprays 60 may be provided to aid in moving the floating polymer toward the delivery conveyor 62.

Delivery conveyor 62 should be relatively wide and should extend substantially over the width of the tank. Thus, as the water is drawn from the tank at an outlet, which is preferably at or near the water surface, the floating polymer is urged toward the conveyor 62 by the resulting current and the effect of directed sprays 60. Suitable conduits and blowers (not shown) may be employed with hood 56 to draw off vaporized solvent. Thus, the removal of solvent from the polymer solution may, in certain applications, be achieved without contact of the polymer solution with a surface to which it will adhere.

Referring now to FIGURE 9, it will be seen that for some applications it may be desirable to combine the embodiments of FIGURES 1 and 8 for more complete removal of the solvent. For this purpose, lateral extension 64 of the top portion of tank 42 may be provided in which a mesh belt conveyor 66 is positioned to receive the floating polymer for further immersion and devolatilization. To maintain the desired temperature in extension 64, additional steam pipes 68 may be provided.

Although the embodiments of the invention as shown in the drawings disclose apparatus which is open to the air, it is preferable to enclose the apparatus in commercial applications, and exclude all or most of the air and to prevent the formation of explosive air-solvent mixtures and to facilitate solvent recovery.

Thus, it should be apparent that the methods and apparatus of the present invention are particularly useful in removing the solvents from elastomers and like polymers in solution which are difficult to handle because of their stickiness and adhering qualities. Once set into operation, the invention provides a continuous solvent removal process that may be automatically run as long as desired, delivering a continuous stream of easily-handled polymer.

It should be obvious that the polymer material delivered by the methods and apparatus of the invention may be readily air dried by a continuous drying operation. As the polymer is delivered as long strands or ribbons, it is in ideal condition for continuous feeding to belt or other types of dryers. Because of the large surface area and porosity of the polymer in its delivered form, residual water and solvent traces can be evaporated with a minimum application of heat and/or air.

The polymer delivered is in much better condition for drying than the polymer chunks delivered by the continuous rotary drum-type filters employed in present day methods. The delivered polymer produced by the methods and apparatus of my invention may be rapidly and effectively dried on continuous belt dryers which are much more economical than the massive and expensive chunk dryers, now in use.

When final treatment of the polymer by extrusion is desired for subsequent processing or for other reasons, the essentially solvent free, but water wet, polymer produced by my invention may be preliminarily squeezed with rolls or otherwise partially dried, and then fed into an extrusion device to remove the remainder of the water.

It should be understood that the terms "polymer" and 'polymer solution" as used in the specification and claims are meant to encompass polymers, copolymers, elastomers, and any other like materials in solution, suspension, or any other mixture thereof, including all combinations of constituents as listed in classes A, B, and C above. It should also be understood that the term "liquid" or "liquid bath" as recited in the claims refers to any liquid or solution having the desirable characteristics for carrying out the invention. It should be further understood that the terms "injected" and "into" in regard to initial placing of the polymer solution in contact with the liquid bath also is deemed to encompass ejecting the polymer solution onto the liquid bath.

It will thus be seen that the objects set forth above, among those made apparent from the preceding description, are efficiently attained and, since certain changes may be made in carrying out the above process and the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

I claim:
1. Apparatus for the removal of solvent from a polymer solution comprising in combination, a trough having a closed end and an open end, a polymer solution injector at the closed end of said trough, means for causing a heat transfer liquid to flow along said trough from the closed end toward the open end, said liquid flow means including directional sprays of said liquid, a tank positioned adjacent the open end of said trough to receive liquid therefrom and movable hydrophilic mesh belt means in said tank below the open end of said trough whereby polymer solution injected into the liquid in said trough is floated along toward the open end of said trough where it is transferred to said belt means by the flow of said liquid and is immersed and moved through the liquid in said tank by said belt means thereby removing a portion of said solvent in said trough and a further portion of said solvent in said tank.

2. Apparatus for removal of solvent from a polymer solution comprising, in combination, a trough, means for moving a heat transfer liquid through said trough, means for injecting the polymer solution into the liquid in said trough in relatively long, continuous pieces, spray means mounted adjacent said trough for directing heat transfer liquid toward the moving polymer solution, and conveyor means for removing the polymer from the liquid after removal of the solvent therefrom.

3. Apparatus for the removal of solvent from polymer solutions comprising in combination, a tank adapted to contain a heat transfer liquid, an injector in said tank positioned near the bottom thereof, a horizontally disposed extension on the top portion of said tank having conveyor means for immersing and moving the polymer in said liquid for further removal of solvent, and a delivery conveyor adjacent the top portion of said tank for removal of devolatilized polymer.

4. Apparatus for removal of solvent from polymer solutions comprising, in combination, a tank adapted to contain a heat transfer liquid, an injector in said tank below the predetermined level of said liquid for injection of polymer solutions therein, said injector being spaced from the sides of said tank, spray means adjacent the top of said tank for directing liquid toward polymer solution floating in said tank and a delivery conveyor adjacent said tank for removal of devolatilized polymer whereby said spray means aids in preventing adherence of the polymer solution to the sides of said tank.

5. Apparatus for the removal of solvent from a low tensile strength polymer solution comprising, in combination, a tank adapted to contain a heat-transfer liquid, means for heating the heat-transfer liquid within said tank, a polymer solution injector in said tank, conveyor means in said tank for moving the polymer solution therethrough and for immersing the polymer solution therein, said conveyor means including a mesh belt assembly positioned in said tank to retain the polymer solution below the heat transfer liquid level in said tank and means for removing the polymer from said tank after the solvent is removed from the polymer.

6. Apparatus for the removal of solvent from a low tensile strength polymer solution comprising, in combination, a trough, a polymer solution injector adjacent one end of said trough, a tank adjacent the other end of said trough, liquid directing means along said trough for keeping polymer solution from adhering to the sides of said trough, means for heating a liquid in said trough and said tank, conveyor means in said tank for receiving partially devolatilized polymer from said trough, said conveyor being positioned lengthwise of said tank and including a mesh belt for immersing and moving polymer solution through a liquid in said tank whereby polymer solution is moved through said trough by liquid movement and is immersed and moved through liquid in said tank by said conveyor.

7. The method of removing solvents from polymer solutions comprising the steps of injecting said solution into a bath of liquid having a temperature higher than the boiling point of the solvent of said solution, floating said polymer solution on said liquid, moving said polymer solution with said liquid, and spraying said polymer solution with said liquid as said polymer solution is floated on said bath, said spraying being directed to heat said polymer solution and also to move and guide said solution, and immersing said polymer solution during at least part of the time it is in contact with said liquid whereby solvent in said solution is vaporized and expelled by heat transferred from said liquid to said polymer solution.

8. The method of removing solvents from polymer solutions comprising the steps of injecting said polymer solution into a bath of flowing liquid having a temperature higher than the boiling point of said solvent to cause a swelling of said solution, floating the swollen polymer on said liquid bath for partial removal of said solvent, spraying said polymer solution with said liquid as it is floated on said bath, and then moving the swollen polymer through said bath while immersed therein to remove the desired amount of said solvent, said polymer being maintained as a relatively long continuous moving piece as said polymer solution is floated on and moved through said bath.

9. The method of removing volatile solvents from sticky, low-tensile strength polymer solutions, comprising the steps of heating a heat transfer liquid at least to a temperature at which solvent in the polymer solution will be volatilized when the polymer solution is brought into contact with the heat transfer liquid, dividing the polymer solution into a plurality of strands substantially larger than a filament, bringing the polymer solution in strand form into contact with the heated liquid, floating the polymer solution on the surface of the heat transfer liquid and flowing the heat transfer liquid in a substantially horizontal direction to move the polymer solution by movement of the heat transfer liquid, whereby volatilized solvent is driven from the polymer solution by heat from the heat transfer liquid and the sticky polymer solution contacts only the heat transfer liquid until a substantial portion of the solvent in the polymer solution has been removed therefrom.

10. The method defined in claim 9 with the added steps of injecting the polymer solution into the heat transfer liquid in long continuous strand form and regulating the rate and direction of movement of the heat transfer liquid relative to the rate of polymer solution injection to retain the polymer solution in long strand form for a substantial portion of its movement along the surface of said heat transfer liquid thereby preventing strand breakage and adherence of the sticky polymer solution to processing apparatus.

11. The method defined in claim 9 wherein the polymer solution is inverted for further solvent removal after a portion of the solvent has been removed.

References Cited in the file of this patent

UNITED STATES PATENTS

| | | |
|---|---|---|
| 827,434 | Friedrich | July 31, 1906 |
| 834,460 | Denis | Oct. 30, 1906 |
| 2,267,117 | Mann et al. | Dec. 23, 1941 |
| 2,962,766 | Hinkle et al. | Dec. 6, 1960 |
| 2,988,802 | Tomonari et al. | June 20, 1961 |

UNITED STATES PATENT OFFICE
CERTIFICATE OF CORRECTION

Patent No. 3,060,501          October 30, 1962

Carl L. Beal

It is hereby certified that error appears in the above numbered patent requiring correction and that the said Letters Patent should read as corrected below.

Column 3, line 61, for "about" read -- above --.

Signed and sealed this 18th day of June 1963.

(SEAL)
Attest:

ERNEST W. SWIDER
Attesting Officer

DAVID L. LADD
Commissioner of Patents